United States Patent
Sinev et al.

(10) Patent No.: US 11,622,073 B2
(45) Date of Patent: Apr. 4, 2023

(54) METHOD OF GENERATING A PANORAMIC IMAGE

(71) Applicant: YANDEX EUROPE AG, Lucerne (CH)

(72) Inventors: Dmitry Aleksandrovich Sinev, Domodedovo (RU); Anton Gennadevich Timofeev, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 68 days.

(21) Appl. No.: 17/384,114

(22) Filed: Jul. 23, 2021

(65) Prior Publication Data

US 2022/0174214 A1 Jun. 2, 2022

(30) Foreign Application Priority Data

Nov. 30, 2020 (RU) .............................. 2020139184

(51) Int. Cl.
H04N 5/232 (2006.01)
G06T 7/136 (2017.01)

(52) U.S. Cl.
CPC ......... *H04N 5/23238* (2013.01); *G06T 7/136* (2017.01); *G06T 2200/04* (2013.01);
(Continued)

(58) Field of Classification Search
CPC ....... G06T 2200/04; G06T 2207/10016; G06T 2207/30248; G06T 7/136; H04N 5/23222;
(Continued)

(56) References Cited

U.S. PATENT DOCUMENTS

| | | | |
|---|---|---|---|
| 8,165,348 | B2 | 4/2012 | Hampapur et al. |
| 8,823,837 | B2 | 9/2014 | Kim |
| 9,892,611 | B1 | 2/2018 | Kusens |
| 10,354,510 | B2 | 7/2019 | Hung et al. |
| 10,482,321 | B2 | 11/2019 | Kusens |
| 2020/0050844 | A1 | 2/2020 | Kusens |

(Continued)

FOREIGN PATENT DOCUMENTS

| | | |
|---|---|---|
| CN | 105512658 A | 4/2016 |
| CN | 104580885 B | 5/2018 |

(Continued)

OTHER PUBLICATIONS

English Abstract for KR20190087942 retrieved on Espacenet on Jul. 20, 2021.

(Continued)

*Primary Examiner* — Farzana Hossain
(74) *Attorney, Agent, or Firm* — BCF LLP

(57) ABSTRACT

A method and a system for generating a video of a 3D object are provided. The method comprises: generating a visual reference frame; capturing an image of a surrounding area around the 3D object; in response to detecting within the image at least a portion of the 3D object: generating a bounding box encompassing the at least the portion of the 3D object; determining an overlap parameter between the bounding box and the visual reference frame; comparing the overlap parameter to a plurality of thresholds; in response to the overlap parameter being above a given one of the plurality of thresholds, generating a respective one of a plurality of predetermined indications for adjusting a position of the camera to capture the portion of the 3D object within the visual reference frame, thereby generating an adjusted image thereof used for composing the video of the 3D object.

22 Claims, 8 Drawing Sheets

(52) U.S. Cl.
CPC ............ *G06T 2207/10016* (2013.01); *G06T 2207/30248* (2013.01)

(58) Field of Classification Search
CPC ......... H04N 5/23238; H04N 5/232935; H04N 5/232945
See application file for complete search history.

(56) References Cited

U.S. PATENT DOCUMENTS

| | | | |
|---|---|---|---|
| 2020/0074665 | A1 | 3/2020 | Wang et al. |
| 2020/0134837 | A1 | 4/2020 | Varadarajan et al. |
| 2020/0293796 | A1* | 9/2020 | Sajjadi Mohammadabadi ............ G06V 10/82 |
| 2022/0058871 | A1* | 2/2022 | Cheng .................. G06T 17/205 |

FOREIGN PATENT DOCUMENTS

| | | |
|---|---|---|
| CN | 105512658 B | 3/2019 |
| CN | 111028270 A | 4/2020 |
| JP | 2019023682 A | 2/2019 |
| KR | 100879622 B1 | 1/2009 |
| KR | 20190087942 A | 7/2019 |
| TW | I655612 B | 4/2019 |

OTHER PUBLICATIONS

English Abstract for CN 111028270 retrieved on Espacenet on Jul. 21, 2021.

English Abstract for CN 104580885 retrieved on Espacenet on Jul. 21, 2021.

English Abstract for KR100879622 retrieved on Espacenet on Jul. 21, 2021.

English Abstract for CN 105512658 retrieved on Espacenet on Jul. 21, 2021.

English Abstract for JP2019023682 retrieved on Espacenet on Jul. 21, 2021.

English Abstract for TWI655612 retrieved on Espacenet on Jul. 21, 2021.

\* cited by examiner

METHOD OF GENERATING A PANORAMIC IMAGE

CROSS-REFERENCE

The present application claims priority to a Russian Application No.: 2020139184 filed on Nov. 30, 2020 and entitled "METHOD OF GENERATING A PANORAMIC IMAGE", the content of which is incorporated herein by reference in its entirety.

TECHNICAL FIELD

The present technology relates generally to video recording; and in particular, to a method of generating a panoramic image of a 3D object.

BACKGROUND

Providing images of 3D objects may have various applications—for example, in online listing platforms. As referred to herein, an online listing platform is an open online resource providing capability for one users to sell (also hence referred to herein as "sellers") their goods to other users of such online listing platforms, who may buy those goods (also referred to herein as "buyers"). Thus, such online listing platforms may include a plethora—such as hundreds of thousands or even millions—of classified advertisements associated with various goods. Certain examples of such online listing platforms may include online listing platforms aimed at specific categories of the goods—such as an Auto.ru™ online car-selling platform mostly offering cars, car parts, and associated services; whereas others may allow selling goods of various categories, such as Avito™, Kijiji™, and the like.

More specifically, using functionality of a given online listing platform, the sellers may upload information about a given item they wish to sell, for example, a given car, via an associated user account. Such information may include, for example, images of the given car and certain technical characteristics thereof. At the same time, the buyers may conduct a search for the given car, based on certain technical characteristics they are interested in, and find the given car in the catalog of items associated with the given online listing platform. Further, the buyers may familiarize themselves with an appearance of the given car by virtue of the provided images. As an example, the buyers may be interested in being provided with a panoramic image of the given car, which may have been generated based on a video recording taken while moving an associated camera around the given car.

However, the sellers may fail to properly record such a panoramic image. For example, when a given seller is taking the video recording walking around the given car, their hands may be shaking or trembling at least at certain times during the recording. As another example, they may not be fully aware of an incorrect orientation of their camera while taking the video recording to produce the panoramic image of desirable quality. As a result, the panoramic image of the given car may be unsatisfactory to the buyers, providing poor information on the given car thereto and occupying storage space of the given online listing platform.

Certain prior art approaches have been proposed to tackle the above-identified technical problem aimed at improving the quality of the resulting panoramic image of a given 3D object.

U.S. Pat. No. 10,482,321-B2 issued on Nov. 19, 2019, assigned to Cerner Innovation Inc., and entitled "Methods and Systems for Identifying the Crossing of a Virtual Barrier" discloses systems, methods and media are disclosed for identifying the crossing of a virtual barrier. A person in a 3D image of a room may be circumscribed by a bounding box. The position of the bounding box may be monitored over time, relative to the virtual barrier. If the bounding box touches or crosses the virtual barrier, an alert may be sent to the person being monitored, a caregiver or a clinician.

U.S. Pat. No. 8,165,348-B2 issued on Apr. 24, 2012, assigned to International Business Machines Corp., and entitled "Detecting Objects Crossing a Virtual Boundary Line" discloses an approach that detects objects crossing a virtual boundary line. Specifically, an object detection tool provides this capability. The object detection tool comprises a boundary component configured to define a virtual boundary line in a video region of interest, and establish a set of ground patch regions surrounding the virtual boundary line. The object detection tool further comprises an extraction component configured to extract a set of attributes from each of the set of ground patch regions, and update a ground patch history model with the set of attributes from each of the set of ground patch regions. An analysis component is configured to analyze the ground patch history model to detect whether an object captured in at least one of the set of ground patch regions is crossing the virtual boundary line in the video region of interest.

Korean Patent Application Publication No.: 2019/087,942-A published on Jul. 25, 2019, and entitled "Object Tracking Device and Method" discloses a camera for capturing an object and outputting an image screen, a camera for recognizing the object, setting a target area including the object on the image screen, setting the position of the camera so that the object is included in the image screen, A target object recognition unit for setting a virtual boundary line oil the screen and a target area or camera position if the target object does not cross the virtual boundary line and moving the target area or the camera when the target object moves and crosses the virtual boundary line and a target tracking unit. This makes it possible to prevent deterioration of the viewer's viewing feeling caused by frequent movement of the image screen, and to provide a stable image screen.

SUMMARY

Therefore, there is a need for systems and methods which avoid, reduce or overcome the limitations of the prior art.

Developers of the present technology have realized that the quality of the panoramic view of the given 3D object may be improved if an electronic device associated with the camera could be configured to prompt a user thereof (such as the given seller, as an example) to position the camera, while moving it around the given 3D object, in such a way that the camera properly captures a respective predetermined portion of the given 3D object.

More specifically, embodiments of the present technology are directed to a system and a method for generating, by the electronic device, user feedback indicative of a given improper position of the camera while producing the video recording of the given 3D object. The given improper position of the camera may be determined based on an extent of overlap between a given image of at least a portion of the given 3D object, detected within a respective frame of the video recording, and a specifically defined visual reference frame outlining a field of view of the camera.

Accordingly, based on the provided feedback, the user may be enabled to adjust positions of the camera, while taking the video recording, such that each of a plurality of images represents a respective portion of the given 3D object within predetermined threshold distances from the edges of the visual reference frame, which can further allow compiling the panoramic view of the given 3D of a better quality.

More specifically, in accordance with a first broad aspect of the present technology, there is provided a method for generating a video of a 3D object using a camera. The method is executable by a processor of the camera. The method comprises: generating, by the processor, a visual reference frame, the visual reference frame being indicative of boundaries, within which the 3D object is to be located; capturing, by the processor, an image of a surrounding area around the 3D object; in response to detecting, by the processor, within the image, at least a portion of the 3D object: generating, by the processor, a bounding box encompassing the first given portion of the 3D object; determining, by the processor, an overlap parameter between the bounding box and the visual reference frame, the overlap parameter being indicative of a ratio between a portion of the bounding box outside the visual reference frame and a total surface area of the bounding box; comparing, by the processor, the overlap parameter to a plurality of thresholds, in response to the overlap parameter being above a given one of the plurality of thresholds, generating, by the processor, a respective one of a plurality of predetermined indications for adjusting a position of the camera to capture the portion of the 3D object within the visual reference frame, thereby generating an adjusted image thereof; storing, by the processor, the adjusted image for inclusion thereof in a plurality of images composing the video of the 3D object.

In some implementations of the method, the plurality of predetermined indications comprises a plurality of escalating indications, the plurality of escalating indications being sequentially more prominent as the overlap parameter increases.

In some implementations of the method, a given one of the plurality of predetermined indications associated with a given one of the plurality of thresholds is more pronounced than a previous one of the plurality of predetermined indications associated with a previous one of the plurality of thresholds.

In some implementations of the method, each one of the plurality of thresholds is associated with one of: a respective constant absolute value of the overlap parameter and a respective percentage of an associated edge of the visual reference frame covered by the bounding box outside thereof.

In some implementations of the method, in response to the overlap parameter being above the given one of the plurality of thresholds at two opposite edges of the visual reference frame, the method further comprises generating a first error indication.

In some implementations of the method, the capturing the image is executed in response to the camera being caused to move around the 3D object.

In some implementations of the method, the video is a sequence of images making up a panoramic view.

In some implementations of the method, in response to the capturing the image of the surrounding area around the 3D object being executed less than a predetermined period after generating a pervious one of the plurality of images composing the video of the 3D object, the method further comprises discarding the image from further processing.

In some implementations of the method, the detecting, within the image, the first given portion of the 3D object, further comprises compressing the image.

In some implementations of the method, the compressing further comprises converting the image into a pixel buffer having a 32-bit RGBA format.

In some implementations of the method, the method further comprises determining, based on the first given portion of the 3D object, a type of the 3D object.

In some implementations of the method, in response to the 3D object being not of a predetermined type of 3D objects, the method further comprises discarding the image from further processing.

In some implementations of the method, in response to not determining the type of the 3D object as being the predetermined type in a predetermined number of consecutively captured images, the method further comprises generating a second error indication.

In some implementations of the method, the predetermined type of 3D object comprises a vehicle.

In some implementations of the method, in response to the bounding box encompassing the first given portion of the 3D object having dimensions smaller than respective predetermined thresholds, the method further comprises discarding the image from further processing.

In some implementations of the method, in response to the bounding box encompassing the first given portion of the 3D object being offset at a distance from a center of the visual reference frame greater than a predetermined distance threshold, the method further comprises discarding the image from further processing.

In some implementations of the method, in response to detecting, within the image, along with the first given portion of the 3D object, at least an other portion of an other 3D object, the method further comprises:
  generating for the at least the other portion of the other 3D object, a second bounding box;
  determining respective dimensions of the bounding box and the second bounding box; and
  selecting for further processing one of the bounding box and the second bounding box having smaller dimensions.

In some implementations of the method, in response to the bounding box being positioned within the visual reference frame at a distance spaced away from any of edges thereof by less than a first predetermined distance threshold value, the method further comprises generating a third error indication.

In some implementations of the method, the third error indication comprises a haptic indication.

In some implementations of the method, the method further comprises causing display of the video of the 3D object.

In some implementations of the method, the causing display further comprises causing display of indications of each one the plurality of predetermined indications associated with respective timestamps, a given timestamp associated with a given one of the plurality of predetermined indications being indicative of a time when the given one of the plurality of predetermined indications was generated.

In some implementations of the method, the causing display further comprises causing display of an associated triggered one of the plurality of predetermined indications for a given of the plurality of images.

In the context of the present specification, the term "surroundings" of a given 3D object refers to an area or a volume around the given 3D object including a portion of a current environment thereof accessible for capturing using one or more cameras directed thereto, for example, for generating a sequence of images of the given 3D object.

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smartphones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
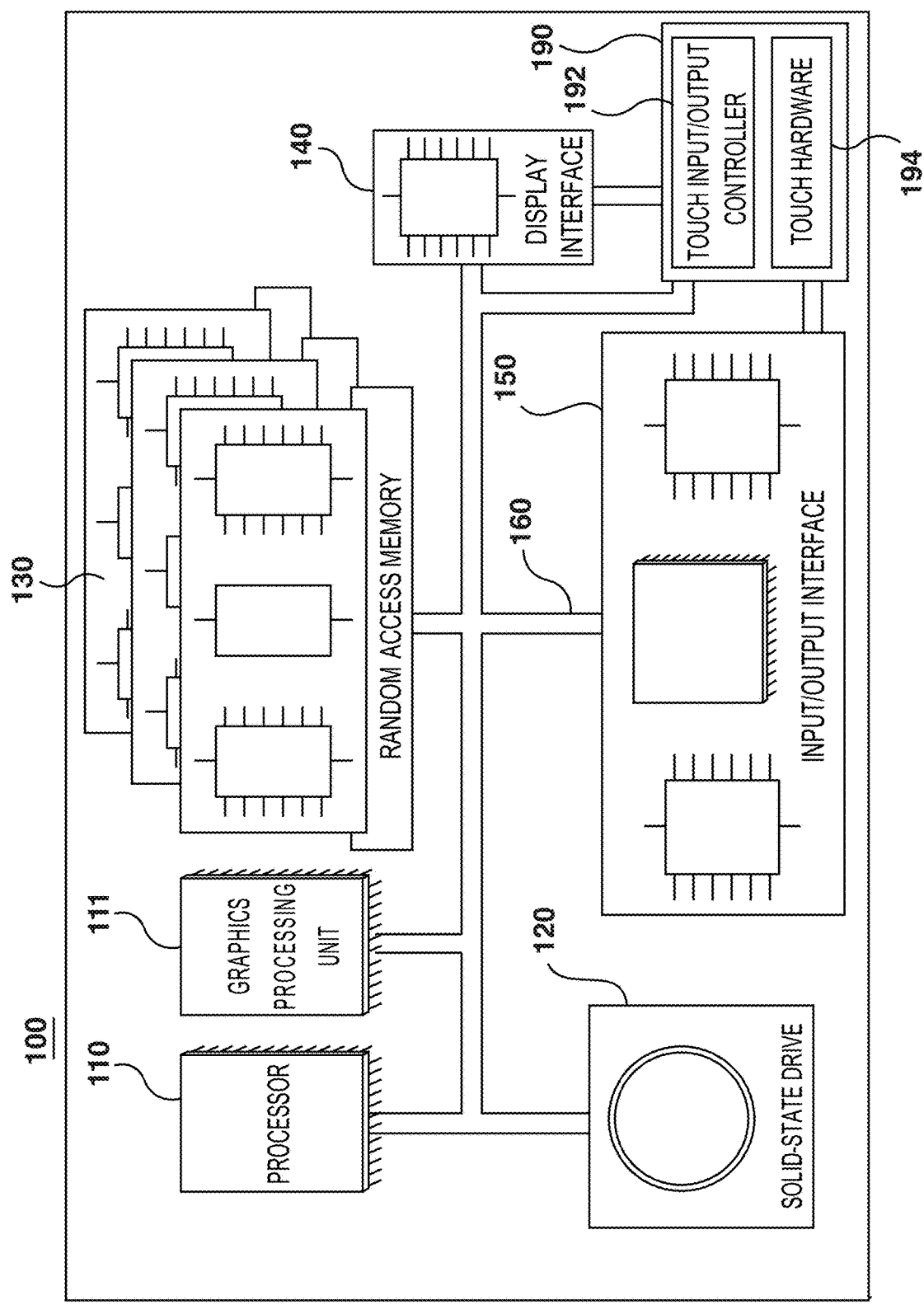
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. In some embodiments, the touchscreen 190 is the screen 215. The touchscreen 190 may equally be referred to as a screen—such as a screen 215 of an electronic device 210 depicted in FIG. 2. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some non-limiting embodiments of the present technology, the input/output interface 150 may be connected to a keyboard (not separately depicted), a mouse (not separately depicted) or a trackpad (not separately depicted) allowing the user to interact with the computer system 100 in addition to or instead of the touchscreen 190.

It is noted some components of the computer system 100 can be omitted in some non-limiting embodiments of the present technology. For example, the keyboard and the mouse (both not separately depicted) can be omitted, especially (but not limited to) where the computer system 100 is implemented as a compact electronic device, such as a smartphone.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
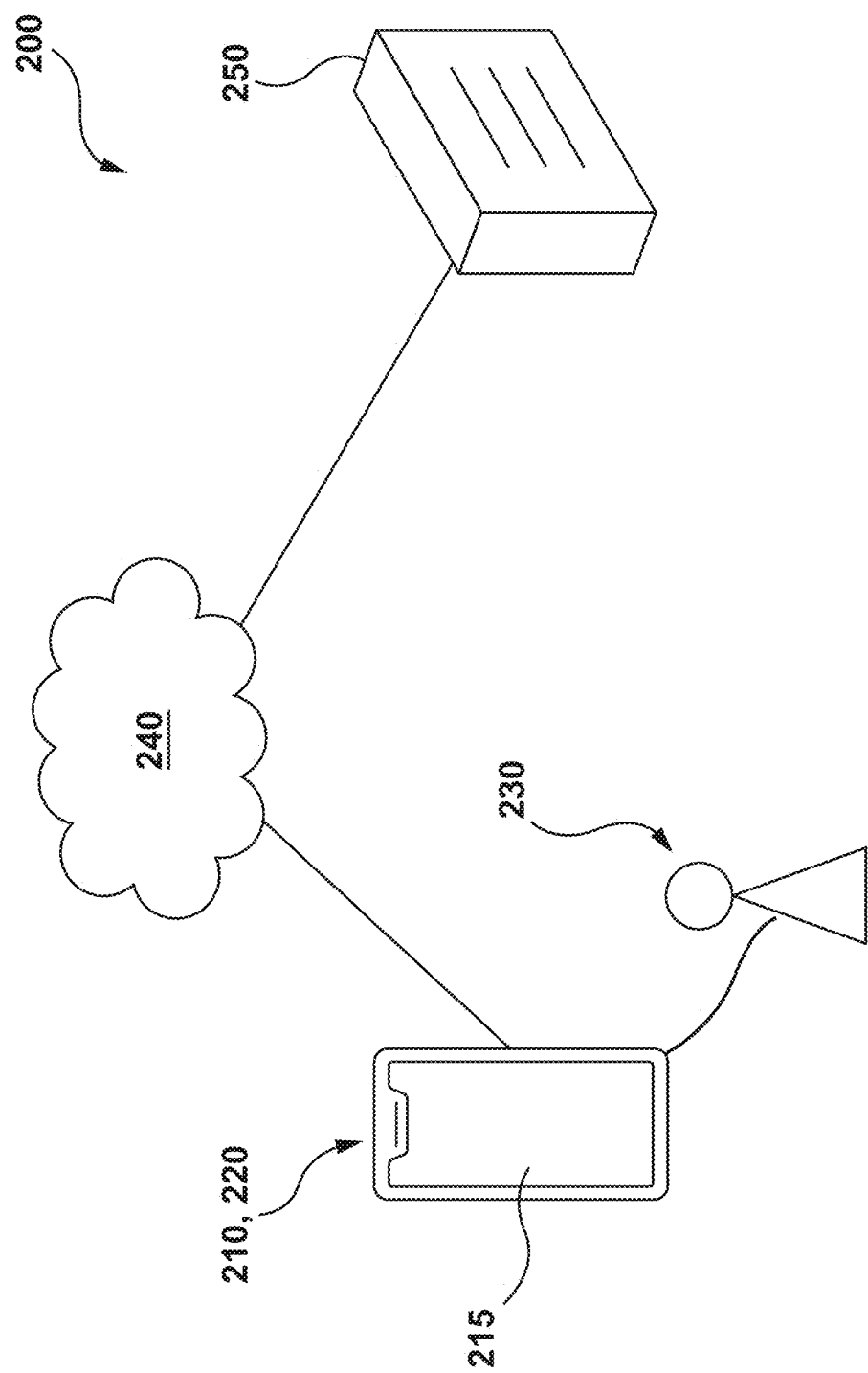
FIG. 2 depicts a schematic diagram of a networked computing environment comprising the computer system of FIG. 1 and being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 communicatively coupled, via a communication network 240, with a server 250. In the non-limiting embodiments of the present technology, the electronic device 210 may be associated with a user 230.

In the non-limiting embodiments of the present technology, the electronic device 210 may be any computer hardware that is capable of running a software appropriate to the relevant task at hand. Thus, some non-limiting examples of the electronic device 210 may include personal computers (desktops, laptops, netbooks, etc.), smartphones, and tablets. Thus, the electronic device 210 may comprise some or all components of the computer system 100 depicted in FIG. 1.

Further, in certain non-limiting embodiments of the present technology, the networked computing environment 200 may include a camera 220 communicatively coupled to the electronic device 210. The camera 220 may be configurable, by the processor 110 of the electronic device 210, to capture image data indicative of objects, towards which it is directed, as well as surroundings thereof.

To that end, in accordance with certain non-limiting embodiments of the present technology, the camera 220 may comprise at least one image sensor and an optical system coupled thereto (both not separately depicted) further coupled to the processor 110 of the electronic device 210. Generally speaking, the at least one image sensor may be configured, by the processor 110, to generate the image data by converting an incoming flow of light into electrical signals. Non-limiting examples of implementing the at least one image sensor may include, for example, a charge-couple device (CCD) image sensor and a complementary metal-oxide-semiconductor (CMOS) image sensor.

In some non-limiting embodiments of the present technology, the at least image sensor may be configured to generate the image data in a form of an image sequence taken with a predetermined time interval. In other non-limiting embodiments of the present technology, the image data may comprise data indicative of a video recording continuously recorded by the at least image sensor during a predetermined period.

In a specific non-limiting example, the at least one image sensor can be implemented as a CMOS image sensor of a type available from SONY SEMICONDUCTOR SOLUTIONS CORPORATION of 4-14-1 Asahicho, Atsugishi, Kanagawa, 243-0014, Japan. It should be expressly understood that the primary image sensor can be implemented in any other suitable equipment.

It should further be understood that, in additional non-limiting embodiments of the present technology, the at least one image sensor of the camera 220 may comprise an array of similarly implemented image sensors.

Accordingly, the processor 110 can further be configured to receive the image data from the camera 220 and store it for further use in one of the solid-state drive 120 and the random-access memory 130, as an example.

Further, using the screen 215 of the electronic device 210, the user 230 may be enabled to observe surroundings of the electronic device 210 for selecting certain objects of interest for capturing, by the camera 220, image data indicative thereof. Further, the processor 110 can be configured to generate, based on the image data received from the camera 220, one or more respective images of the objects of interest and output the one or more respective images in the screen 215.

In some non-limiting embodiments of the present technology, the camera 220 can be a built-in camera. For example, as depicted in FIG. 2, the camera 220 may be part of the electronic device 210, wherein the electronic device 210 is implemented, for example, as a smartphone with the camera 220 being built-in therein. In specific non-limiting example, the smartphone can be Samsung™ Galaxy™ S10 smartphone including the camera 220 having an image resolution of around 12 megapixels and a video recording resolution UHD 4K (3840 by 2160), configured to produce the video recording at a speed of up to 60 frames per second, as an example, and provided by SAMSUNG GROUP of 40th floor Samsung Electronics Building, 11, Seocho-daero 74-gil, Seocho District, Seoul, South Korea. It should be expressly understood that the smartphone can be implemented in any other suitable equipment.

However, in other non-limiting embodiments of the present technology (not depicted), the electronic device 210 may be implemented as a stand-alone digital smart camera device, such as a Canon™ EOS™ 77D mirror digital camera provided by CANON INC. of 3, Chome-30-2 Shimomaruko, Ota City, Tokyo 146-8501, Japan. In these embodiments, at least some functions of the screen 215, such as navigating the camera 220 within the surroundings of the electronic device 210 for selection of the objects of interest, may be available through an optical viewfinder (not depicted) of the electronic device 210. It should be expressly understood that the stand-alone digital smart camera device can be implemented in any other suitable equipment.

In yet other non-limiting embodiments of the present technology (not depicted), the electronic device 210 may be implemented such that does not include the camera 220 built therein. To that end, in these embodiments, the camera 220 may be implemented as a non-smart camera and may further be coupled to the electronic device 210 via a respective communication interface of the input/output interface 150.

Further, according to certain non-limiting embodiments of the present technology, the processor 110 of the electronic device 210 can be configured to receive the image data of the objects of interest and transmit, via the communication network 240, the image data to the server 250.

In accordance with certain non-limiting embodiments of the present technology, the server 250 can be configured to store the image data for providing general access thereto, for example, via a given online listing platform associated with the server 250. As a non-limiting example, the given online listing platform may be the Auto.ru™ online listing platform operated by YANDEX LLC of 16 Lev Tolstoy Street, Moscow, 119021, Russia.

For example, in some non-limiting embodiments of the present technology, the server 250 may be configured to allow access to the image data, via the communication network 240, to a plurality of other electronic devices (not separately depicted) implemented similar to the electronic device 210, associated with various users. Each one of the plurality of other electronic devices may further be configured to generate, based on the received image data, the one or more respective images of the objects of interest captured by the camera 220 of the electronic device 210, and the associated users may thus be enabled to view and/or download the one or more respective images, as an example.

In some non-limiting embodiments of the present technology, the server 250 can be implemented as a conventional computer server and may comprise some or all of the components of the computer system 100 of FIG. 1. In one non-limiting example, the server 250 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 250 is a single server. In alternative non-limiting embodiments of the present technology (not depicted), the functionality of the server 250 may be distributed and may be implemented via multiple servers.

Communication Network

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network are for illustration purposes only. How a respective communication link (not separately numbered) between each one of the electronic device 210, the server 250, each one of the plurality of other electronic devices, and the communication network 240 is implemented will depend, inter alia, on how each one of the electronic device 210, the server 250, and the plurality of other electronic device is implemented. Merely as an example and not as a limitation, in those embodiments of the present technology where the electronic device 210 is implemented as a wireless communication device such as the smartphone, the communication link can be implemented as a wireless communication link. Examples of wireless communication links include, but are not limited to, a 3G communication network link, a 4G communication network link, and the like. The communication network 240 may also use a wireless connection with the server 250, and each one of the plurality of other electronic devices.

Generating Video Recording

As alluded to above, in accordance with certain non-limiting embodiments of the present technology, the processor 110 may be configured to: (1) generate, using the camera 220, a video recording of a given 3D object, such as a 3D object 350 depicted in FIG. 3; (2) store the video recording of the 3D object 350 in one of the solid-state drive 120 and the random-access memory 130; and (3) transmit the video recording to the server 250, for example, via the communication network 240. In additional non-limiting embodiments of the present technology, the processor 110 can also be configured to cause display of the video recording on the screen 215 of the electronic device 210, before transmitting it to the server 250.

According to certain non-limiting embodiments of the present technology, the processor 110 may be configured to generate the video recording of the 3D object 350 while the camera 220 is caused to move around the 3D object 350.

Figure 3:
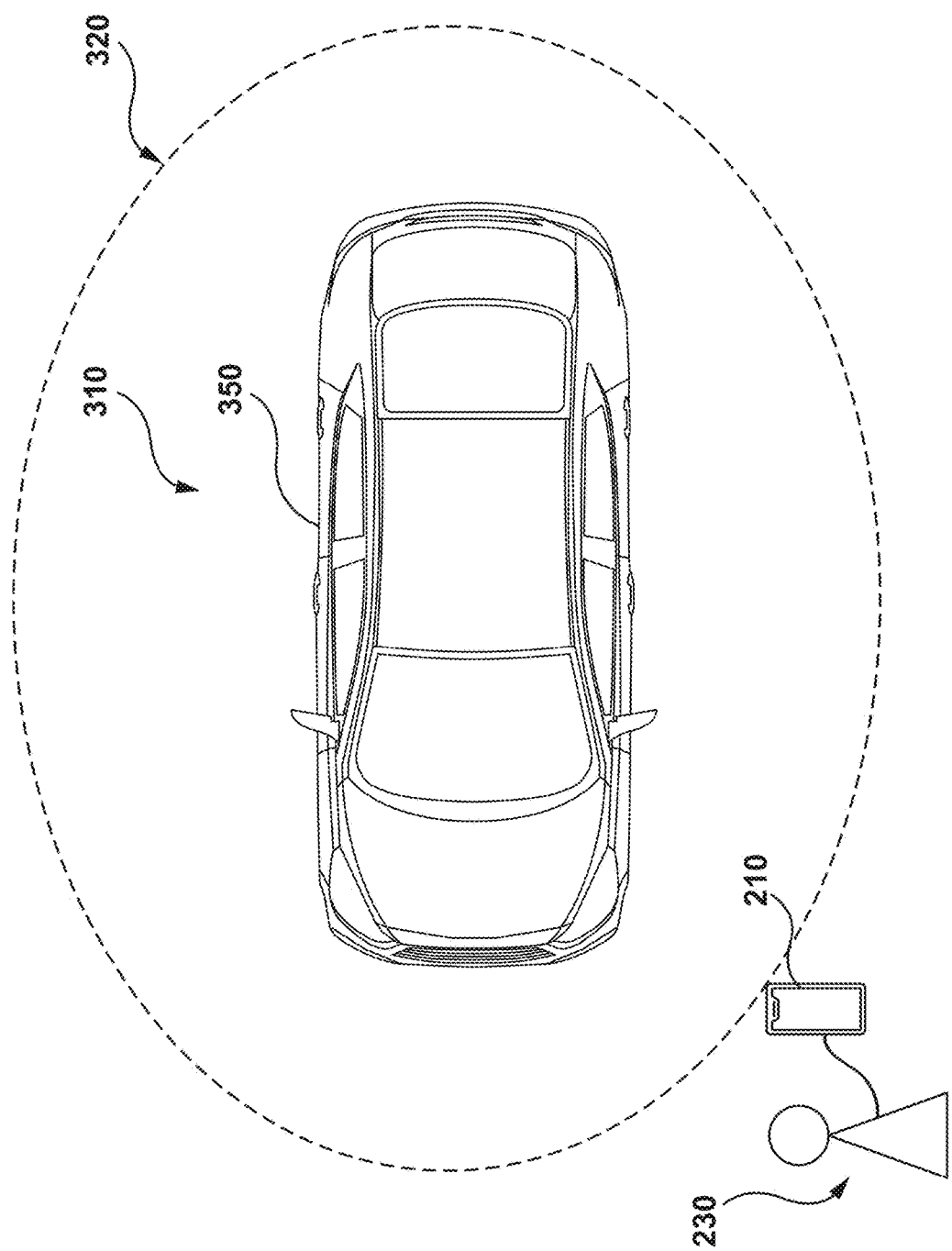
FIG. 3 depicts a schematic diagram of positioning an electronic device of the networked computing environment of FIG. 2 relative to a 3D object for generating, by a processor of the computer system of FIG. 1, a video recording thereof, in accordance with certain non-limiting embodiments of the present technology.

With reference to FIG. 3, there is depicted a schematic diagram of producing the video recording of the 3D object 350, in accordance with certain non-limiting embodiments of the present technology. In some non-limiting embodiments of the present technology, the camera 220 may be caused to move around the 3D object when the user 230, directing the camera 220 towards the 3D object 350 using the electronic device 210, walks around the 3D object 350 along a given trajectory 320. As it can be appreciated, the given trajectory 320 may have a substantially circular form. It should be noted that other ways of causing the camera 220 to move around the 3D object 350 along the given trajectory 320, such as using respective mounting assemblies, may also be envisioned.

Thus, in certain non-limiting embodiments of the present technology, the video recording may comprise a plurality of images taken sequentially as the user 230 walks around the 3D object 350, wherein each one of the plurality of images is indicative of a respective aspect of the 3D object 350 and surroundings 310 thereof, taken from a respective perspective of the camera 220. In certain non-limiting embodiments of the present technology, the processor 110 may be configured to generate, based on the plurality of images, a panoramic view of the 3D object 350 for further transmission thereof to the server 250.

Thus, the panoramic view of the 3D object 350 may be used for simulating, when viewed by other users, a walk around the 3D object 350 for appreciating certain details of an appearance of the 3D object 350 from different perspectives. However, when the user 230 produces the video recording of the 3D object 350, his or her hands may be shaking or trembling. Also, the user 230, while walking around the 3D object 350, may simply be unaware of an incorrect position of the camera 220 relative to the 3D object 350.

For example, the 3D object 350 may be differently centered within the screen 215 of the electronic device 210 in at least some ones of the plurality of images thereof. Also, when the user 230 is positioned too close to the 3D object 350, for example, a representation of the 3D object 350 may go beyond the edges of the screen 215 not enabling the camera 220 to capture a respective aspect of the 3D object 350 in full, in a given one of the plurality of images. Further, when the user 230 is positioned too far away from the 3D object 350, for example, the 3D object 350 may be spaced away from the edges of the screen 215 too much, in the given one of the plurality of images, where instant dimensions of the 3D object 350 may not correspond to those in a previous one of the plurality of images.

Accordingly, the camera 220 positioned incorrectly relative to the 3D object 350 may introduce certain discrepancies in at least some of the plurality of images to be used by the processor 110 to generate the panoramic view of the 3D object 350. As a result, the panoramic view of the 3D object 350 may be skewed for example. Thus, such a panoramic view may not be adequately informative to the other users as a quality thereof may not enable the other users to view each and every aspect of the 3D object 350. As another example, certain discrepancies may cause the processor 110 to altogether fail to generate, based on the plurality of images, the panoramic view of the 3D object 350.

Thus, non-limiting embodiments of the present technology are directed to a method of generating the plurality of images of the 3D object 350 depicting respective aspects thereof consistently positioned within the screen 215, which may further allow generating a smoother panoramic view of the 3D object 350. More specifically, in accordance with certain non-limiting embodiments of the present technology, in response to a given incorrect position of the camera 220, the processor 110 may be configured to cause the electronic device 210 to generate a respective one of a plurality of predetermined indications (for example, for the user 230) for adjusting the current position of the camera 220 to generate a given one of the plurality of images composing the panoramic view of the 3D object 350 of an improved quality. How the given one of the plurality of images of the 3D object 350 can be generated, by the processor 110, in accordance with certain non-limiting embodiments of the present technology, will be described immediately below with reference to FIGS. 4 to 7.

Discarding Improper Images of the 3D Object

Figure 4:
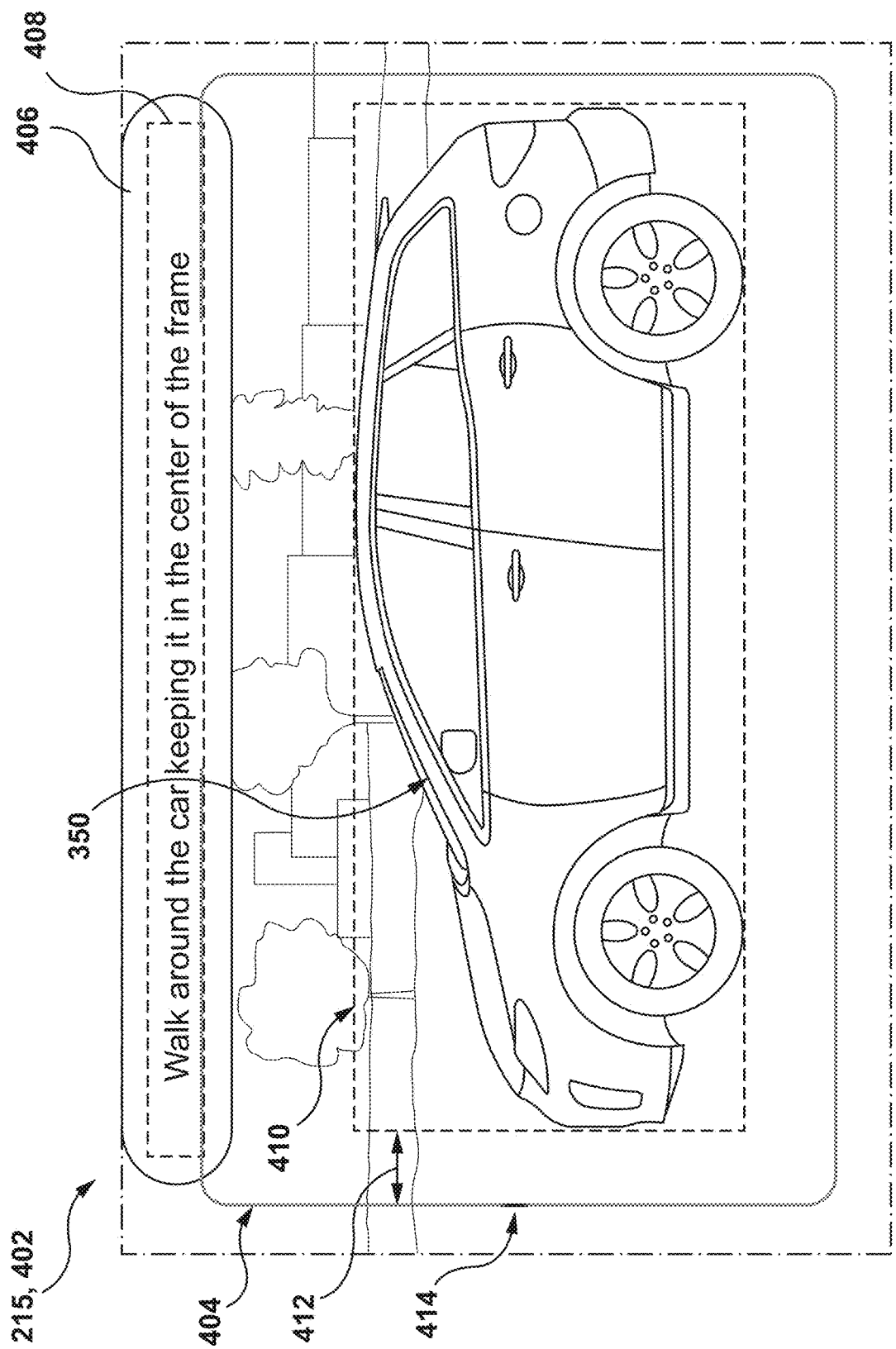
FIG. 4 depicts a schematic diagram of a graphical user interface (GUI) during generating, by the processor of the computer system of FIG. 1, a first one of a plurality of images associated with the video recording of the 3D object present in FIG. 3, in accordance with certain non-limiting embodiments of the present technology.

With reference to FIG. 4, there is depicted a schematic diagram of a GUI during generating, by the processor 110, a first image 402 of the plurality of images of a first given aspect of the 3D object 350, in accordance with certain non-limiting embodiments of the present technology.

As it can be appreciated from FIG. 4, in accordance with certain non-limiting embodiments of the present technology, the processor 110 may be configured to generate, within the screen 215, a visual reference frame 404. By the present technology, the visual reference frame 404 is used as an aid for the user 230 to orient the camera 220 relative the 3D object 350. In other words, the visual reference frame 404 is indicative of boundaries, within the screen 215 of the electronic device 210, within which the 3D object 350 should be located during the taking the video recording thereof to enable the processor 110 to generate the panoramic view of the 3D object 350. The visual reference frame 404 may also be used to provide certain ones of the plurality of predetermined indications in case where the camera 220 is positioned incorrectly relative to the 3D object 350, as will be described below.

Further, in some non-limiting embodiments of the present technology, the processor 110 can be configured to generate, within the screen 215, an information message window 406 for outputting therein messages, such as a first given message 408, associated with respective ones of the plurality of predetermined indications prompting the user 230 on performing certain actions relating to positioning the camera 220 relative to the 3D object 350 to generate the panoramic view thereof. The information message window 406 may be used for providing at least some of the plurality of predetermined indications, such as error messages notifying the user 230 of the incorrect current position of the camera 220 relative to the 3D object 350, as will be described further below.

As mentioned hereinabove, using the camera 220 and the screen 215 of the electronic device 210, the user 230 may be enabled to capture the first image 402 of the surroundings 310 of the 3D object 350 including, at least, a first given portion thereof (depicted in FIG. 4). In accordance with certain non-limiting embodiments of the present technology, the processor 110 may be configured to use the first image 402 if it has been captured in a predetermined time interval after capturing a previous one of the plurality of images of the 3D object 350, the previous one of the plurality of images having been taken immediately prior to the capturing the first image 402. For example, in response to the first image 402 having been captured in less than the predetermined time interval after capturing the previous one of the plurality of images, the processor 110 may be configured to discard the first image 402 from further processing. In some non-limiting embodiments of the present technology, the predetermined time interval may be, for example, 3 seconds. However, it should be noted that, in various other non-limiting embodiments of the present technology, other values of the predetermined time interval may be used, such as 1, 2, 5, or even 10 seconds, as an example.

Accordingly, if the processor 110 determines that the first image 402 has been captured, by the camera 220, in a time interval after the capturing the previous one of the plurality of images, which is equal to or greater than the predetermined time interval, the processor 110 can further be configured to detect, within the first image 402, the first given portion of the 3D object 350 indicative of the first given aspect thereof. To that end, in some non-limiting embodiments of the present technology, the processor 110 may be configured to apply one or more object recognition techniques.

In some non-limiting embodiments of the present technology, the processor 110 may first be configured to convert the first image 402 into one of predetermined image formats for further analysis. In some non-limiting embodiments of the present technology, the one of the predetermined image formats comprises a 32-bit RGBA image format, as an example. However, it should be noted that other predetermined image formats can also be used without departing from the scope of the present technology. In additional non-limiting embodiments of the present technology, prior to the converting, the processor 110 may be configured to compress the first image 402, thereby reducing it to a predetermined size, such as 300 by 300 pixels, as an example. It should also be expressly understood that, in various non-limiting embodiments of the present technology, the predetermined size for the procedure of compressing the first image 402 is not limited by the above value, and may be for example, 100 by 100 pixels, 200 by 200 pixels, and 500 by 500, as an example.

In some non-limiting embodiments of the present technology, the one or more object recognition techniques may include, without limitation, pattern object recognition techniques and feature-based geometric object recognition techniques. The pattern object recognition techniques may further include, for example, and not as a limitation, classification techniques, clustering techniques, regression techniques, real-valued sequence labelling techniques, and the like. Further, the feature-based geometric object recognition techniques may include, without limitation: pose clustering techniques, invariance techniques, geometric hashing techniques, and the like. It should further be noted that, in some non-limiting embodiments of the present technology, implementation of both the pattern object recognition techniques and the feature-based geometric object recognition techniques may be based on one or more machine-learning algorithms. To that end, the one or more machine-learning algorithms may be specifically configured (trained) to detect the 3D object 350 based on a respective training set of data comprising, inter alia, annotated (labelled) images of various aspects thereof.

Further, in accordance with certain non-limiting embodiments of the present technology, the processor 110 may be configured, based on the first given portion of the 3D object 350, and using the one or more object recognition techniques, to determine an object type associated therewith. Thus, in accordance with certain non-limiting embodiments of the present technology, applying the one or more object recognition techniques, the processor 110 may be configured to detect the first given portion of the 3D object 350 within the first image 402, and further determine the object type associated therewith. By way of example only, in some non-limiting embodiments of the present technology, the object type may comprise a vehicle, an item of furniture, an article of clothing, a plant, an animal, and the like.

In certain non-limiting embodiments of the present technology, the first image 402 may not enable the processor 110 to determine the object type of the 3D object 350. For example, the first given portion of the 3D object 350 may be too small as it may be non-indicative thereof, and as such, the one or more object recognition techniques may fail to determine the object type of the 3D object 350 based on the first given portion thereof. Thus, in response to not determining the object type of the 3D object 350, the processor 110 may be configured to generate a first error indication of the plurality of predetermined indications. For example, in some non-limiting embodiments of the present technology, the first error indication may comprise a first error message (not depicted), which the processor 110 may further be configured to output in the information message window 406. For example, the first error message (not depicted) may notify the user 230 that the processor 110 has failed to determine presence of the 3D object 350 within the screen 215. In some non-limiting embodiments of the present technology, the processor 110 may be configured to generate the first error message (not depicted) after a predetermined number of consecutive attempts to determine the object type of the 3D object 350 within respective ones of the plurality of images thereof. In specific non-limiting embodiments of the present technology, the predetermined number of consecutive attempts may be 3; however, other values of the predetermined number of consecutive attempts, such as 2, 4, or even 10, for example, may also be used by the processor 110 without departing from the scope of the present technology.

In some non-limiting embodiments of the present technology, the object type may be predetermined, in a sense that the processor 110 may be configured to determine if the 3D object 350 is of a predetermined object type. As an example, and not as a limitation, in some non-limiting embodiments of the present technology, the predetermined object type may be a vehicle, such as a car, a truck, a bus, and the like.

Thus, in some non-limiting embodiments of the present technology, if the processor 110 has failed to determine that the 3D object 350 is of the predetermined object type, the processor 110 can further be configured to discard the first image 402 from further processing.

Accordingly, in response to determining the object type of the 3D object 350 based on the first given portion thereof in the first image 402, the processor 110 can be configured to analyze a spatial position of the first given portion of the 3D object 350 within the visual reference frame 404. As it may become apparent, the spatial position of the first given portion of the 3D object 350 within the visual reference frame 404 can be indicative of the current position of the camera 220 relative to the 3D object 350. Thus, based on analyzing the spatial position, the processor 110 may be configured to generate at least some of the plurality of predetermined indications, if need be, prompting the user 230 to adjust the current position of the camera 220 to generate an adjusted given one of the plurality of images composing the panoramic view of the 3D object 350 or discard the first image 402 from further processing altogether.

Further, with continued reference to FIG. 4, in accordance with certain non-limiting embodiments of the present technology, in order to analyze the spatial position of the first given portion of the 3D object 350 within the visual reference frame 404, the processor 110 can be configured to generate a bounding box 410 encompassing the first given portion of the 3D object 350.

In the context of the present specification, the term "bounding box" broadly refers to a three-dimensional box (such as a parallelepiped) or a two-dimensional box (such as a rectangle—for example, the bounding box 410) of a smallest possible measure (such as a volume or an area thereof, respectively) allowing for entirely enclosing a given 3D object, such as given portion of the 3D object 350 represented in a respective one of the plurality of images thereof.

For example, in some non-limiting embodiments of the present technology (not depicted), the processor 110 may be configured to discard the first image 402 if at least one of a vertical dimension and a horizontal dimension of the bounding box 410 is smaller (or not greater, as another example) than a respective one of a vertical dimensional threshold value and a horizontal dimensional threshold value. In some non-limiting embodiments of the present technology, each one of the vertical dimensional threshold value and the horizontal dimensional threshold value may be predetermined as being absolute values. However, in other non-limiting embodiments of the present technology, the vertical dimensional threshold value and the horizontal dimensional threshold value may be predetermined as a percentage of a respective edge of the visual reference frame 404. By way of example, the vertical dimensional threshold value may be predetermined as being 25% of a vertical edge of the visual reference frame 404; and the horizontal dimensional threshold value may be predetermined as being 20% of a horizontal edge of the visual reference frame 404.

Further, in accordance with certain non-limiting embodiments of the present technology (not depicted), the processor 110 may be configured to discard the first image 402 if the bounding box 410 encompassing the first given portion of the 3D object 350 has such dimensions that it does not cover a center of the visual reference frame 404. Also, in other non-limiting embodiments of the present technology, the processor 110 can be configured to discard the first image 402 if a center of the bounding box 410 is offset at a distance from the center of the visual reference frame 404 greater than a predetermined offset distance threshold value.

Further, let it be assumed that the first image 402 represents, along the first given portion of the 3D object 350, a given portion of at least an other 3D object, for example, a second 3D object (not depicted in FIG. 4). Thus, in accordance with certain non-limiting embodiments of the present technology, the processor 110 may be configured to generate a second bounding box (not depicted) encompassing the given portion of the second 3D object. In these embodiments, the processor 110 may be configured, based on the associated bounding boxes, to select one of the 3D object 350 and the second 3D object (not depicted) for further generating a respective panoramic view thereof. Hence, in some non-limiting embodiments of the present technology, the processor 110 can be configured to determine respective dimensions of each one of the bounding box 410 and the second bounding box (not depicted), and further select one having smallest dimensions. In other words, the processor 110 can be configured to select one of the bounding box 410 and the second bounding box (not depicted) having a smallest surface area.

Additionally, in some non-limiting embodiments of the present technology, the processor 110 may be configured to generate one or more of the plurality of predetermined indications if the bounding box 410 is spaced away from any of the edges of the visual reference frame 404 by less than a predetermined distance threshold value. For example, as depicted in FIG. 4, the bounding box 410 is spaced away from a left edge (not separately labelled) of the visual reference frame 404 by a given distance 412. Thus, according to certain non-limiting embodiments of the present technology, in response to the given distance 412 being less than the predetermined distance threshold value, the processor 110 may be configured to generate a second error indication of the plurality of predetermined indications. As it may be appreciated, the second error indication may be to notify the user 230 that the camera 220 is positioned too close to the 3D object 350 while capturing the first image 402.

It should be noted that, in some non-limiting embodiments of the present technology, the predetermined distance threshold value may be equal for each of the edges (not separately labelled) of the visual reference frame 404—such as 15 points, as an example. However, in other non-limiting embodiments of the present technology, the predetermined distance threshold value may be different for each one of the edges of the visual reference frame 404—for example, the predetermined distance threshold value can be 15 points for the left edge, 10 points for the right edge, and the like.

For example, in some non-limiting embodiments of the present technology, the second error indication may comprise a haptic interaction between the user 230 and the electronic device 210, which the processor 110 causes the electronic device 210 to generate. As an example, the haptic interaction may be a vibration of a body (not separately labelled) of the electronic device 210.

Generating Adjusted Images of 3D Object

As mentioned hereinabove, in accordance with certain non-limiting embodiments of the present technology, the processor 110 may be configured to generate one or more of the plurality of predetermined indications for adjusting the current position of the camera 220 relative to the 3D object 350, thereby generating those of the plurality of images further used for composing the panoramic view of the 3D object 350.

To that end, in some non-limiting embodiments of the present technology, the processor 110 may be configured to generate the one or more of the plurality of predetermined indications based on the spatial position of the bounding box 410 relative to the visual reference frame 404. To that end, in some non-limiting embodiments of the present technology, the processor 110 may be configured to generate some of the plurality of predetermined indications based on a so called overlap parameter associated with a given one of the plurality of images—such as the first image 402.

In some non-limiting embodiments of the present technology, the overlap parameter can be determined as a ratio of a portion of the total surface (not separately labelled) of the bounding box 410 outside the visual reference frame 404 to the total surface area of the bounding box 410. However, in other non-limiting embodiments of the present technology, the overlap parameter may be determined as an absolute size, such as in points, for example, of a portion of the bounding box 410 covering a respective one of the edges of the visual reference frame 404.

Also, in additional non-limiting embodiments of the present technology, the total surface of the bounding box 410 may be determined taking into account certain tolerance, such as the predetermined distance threshold value associated with each of the edges of the visual reference frame 404 mentioned above in respect of the second error indication. As such, as depicted in FIG. 4, in response to the bounding box 410 being spaced away from the visual reference frame 404 by less than the predetermined distance threshold value, the processor 110 may be configured to generate a visual indication 414 of the plurality of predetermined indications.

In some non-limiting embodiments of the present technology, the visual indication 414 may be a color change of an associated edge of the visual reference frame 404 deriving from a center thereof and extending outwardly. In some non-limiting embodiments of the present technology, an extent of the visual indication 414, that is, a size of a portion of the associated one of the edges of the visual reference frame 404, to which the color change applies, may be indicative of a value of the overlap parameter between the bounding box 410 and the visual reference frame 404.

As will be described below with reference to FIGS. 5 and 6, in some non-limiting embodiments of the present technology, a dependency between the extent of the visual indication 414 and the value of the overlap parameter may be linear. However, in other non-limiting embodiments of the present technology, other dependencies between these values may also be envisioned, such as quadratic, cubic, and exponential, as an example.

In some non-limiting embodiments of the present technology, the overlap parameter between the bounding box 410 and the visual reference frame 404 may be associated with a plurality of overlap parameter thresholds. Further, in these embodiments, upon the overlap parameter exceeding a given one of the plurality of overlap parameter thresholds, the processor 110 may be configured to generate a respective one of the plurality of predetermined indications. Also, in response to the overlap parameter being equal to or greater than the given one of the plurality of overlap parameter thresholds, the processor 110 may be configured generate the visual indication 414 of a respective extent, as will be described below.

According to specific non-limiting embodiments of the present technology, each one of the plurality of overlap parameter thresholds may comprise at east one of: (1) in those embodiments where the overlap parameter is determined as the ratio between the outside portion of the bounding box and the total surface area of the bounding box 410, a respective percentage threshold value of the overlap parameter; and (2) in those embodiments where the overlap parameter is determined as the absolute value of the outside portion, a respective absolute threshold value of the overlap parameter indicative of an absolute value of a size of the outside portion of the bounding box 410.

In some non-limiting embodiments of the present technology, the plurality of overlap parameter thresholds may include at least three overlap parameter thresholds: a lower overlap parameters threshold, a middle overlap parameters threshold, and a higher overlap parameter threshold. In specific non-limiting embodiments of the present technology, each one of the plurality of overlap parameter thresholds may further be, depending on specific embodiments, respectively: 1% or 5 points; 5% or 25 points; and 11% or 55 points, as an example.

In some non-limiting embodiments of the present technology, both a current percentage of the overlap parameter and a current absolute value thereof may be determined, by the processor 110, simultaneously for each one of the plurality of images. Further, in these embodiments, the processor 110 may be configured to select a minimum one of the current percentage of the overlap parameter and the current absolute value thereof for comparing to the plurality of overlap parameter thresholds. By so doing, the overlap parameter may be reliably assessed irrespective of a size of the screen 215 of the electronic device 210.

For example, in response to the overlap parameter between the bounding box and a given one of the edges of the visual reference frame 404 being equal to or greater than the lower overlap parameter threshold (but less than the middle overlap parameter threshold), the processor 110 may be configured to generate the visual indication 414 of a first respective extent, as depicted in FIG. 4, as an example.

Figure 5:
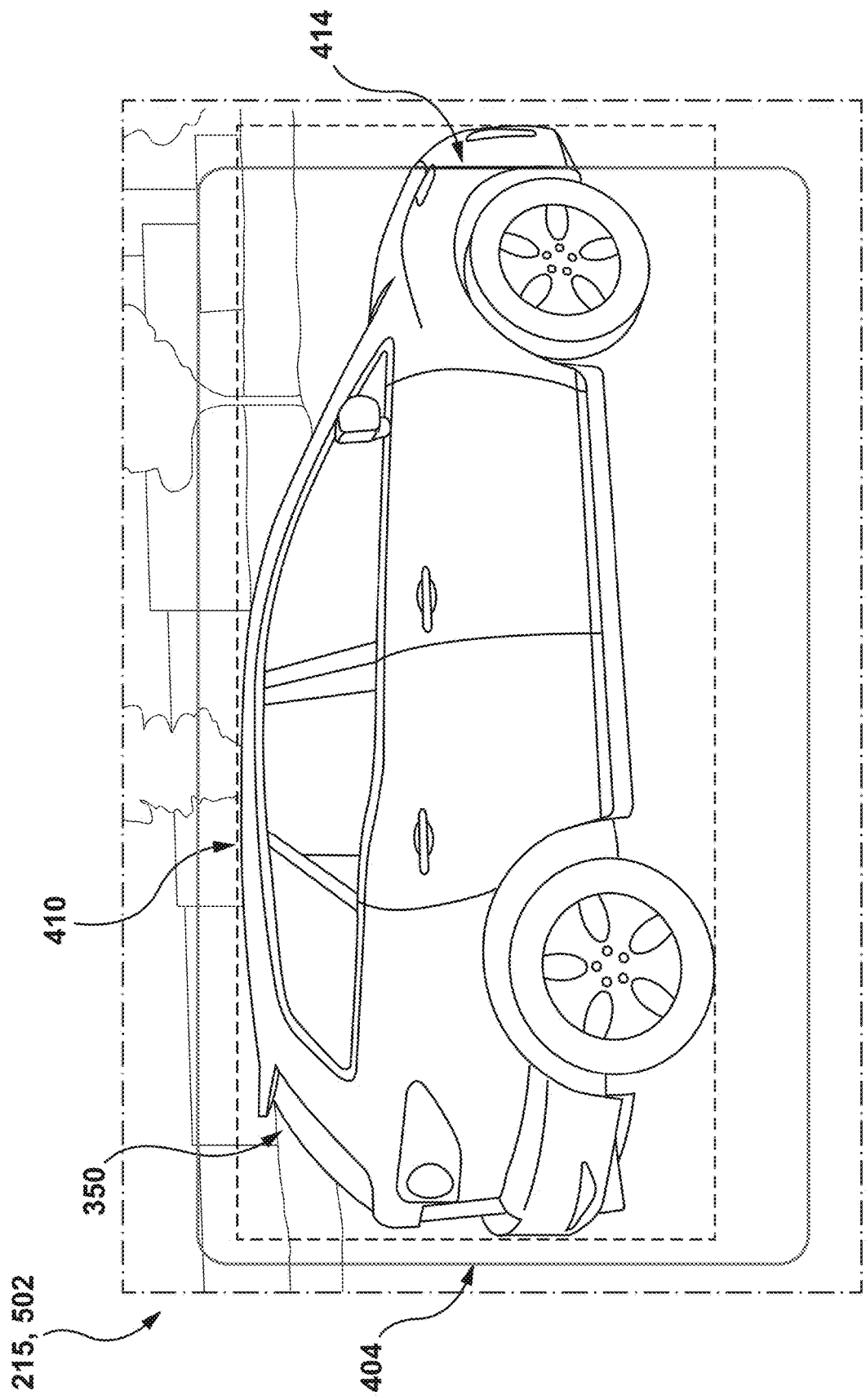
FIG. 5 depicts a schematic diagram of a GUI during generating, by the processor of the computer system of FIG. 1, a second one of a plurality of images associated with the video recording of the 3D object present in FIG. 3, in accordance with certain non-limiting embodiments of the present technology.
Figure 6:
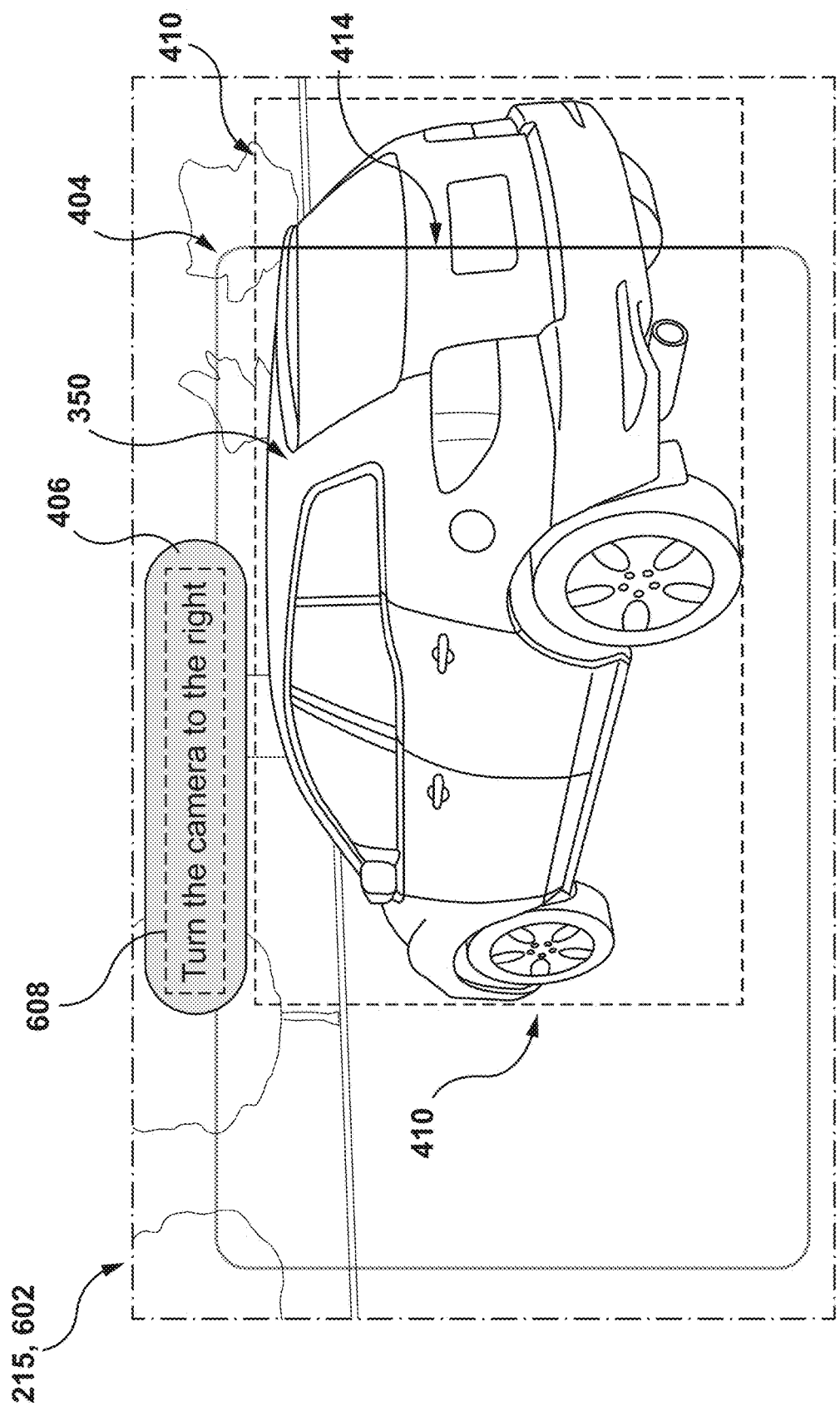
FIG. 6 depicts a schematic diagram of a GUI during generating, by the processor of the computer system of FIG. 1, a third one of a plurality of images associated with the video recording of the 3D object present in FIG. 3, in accordance with certain non-limiting embodiments of the present technology.

Further, with reference to FIG. 5, there is depicted a schematic diagram of a GUI during generating, by the processor 110, a second image 502 of the plurality of images of the 3D object 350, in accordance with certain non-limiting embodiments of the present technology. As it can be appreciated, the second image 502 depicts a second given portion of the 3D object 350, which is indicative of a second given aspect thereof captured at a respective perspective of the camera 220 relative thereto.

As it may become apparent, the processor 110 may have been configured to detect, within the second image 502, the second given portion of the 3D object 350 and further determine the object type of the 3D object 350 based on the second given portion thereof in a similar fashion described above in respect of the first image 402. Further, the processor 110 may be configured to generate the bounding box 410 encompassing the second given portion of the 3D object 350 and determine if, based on the dimensions thereof, the second image 502 is to be discarded from further processing or not as described above with reference to FIG. 4.

Further, in some non-limiting embodiments of the present technology, the processor 110 may be configured to determine that the overlap parameter associated with the second image 502 exceeds the middle overlap parameter threshold (however, does not exceed the higher overlap parameter threshold). To that end, the processor 110 may be configured to generate the visual indication 414 of a second respective extent, the second respective extent being greater than the first respective extent, as it can be appreciated from FIG. 5.

Finally, in response to the overlap parameter exceeding the higher overlap parameter threshold, the processor 110 may be configured to generate more prominent ones of the plurality of predetermined indications. With reference to FIG. 6, there is depicted a schematic diagram of a GUI during generating, the processor 110, a third image 602 of the plurality of images of the 3D object 350, in accordance with certain non-limiting embodiments of the present technology. As it can be appreciated, the third image 602 depicts a third given portion of the 3D object 350, which is indicative of a third given aspect thereof captured at a respective perspective of the camera 220 relative thereto.

In some non-limiting embodiments of the present technology, the processor 110 may be configured to determine that the overlap parameter associated with the third image 602 exceeds the higher overlap parameter threshold. To that end, the processor 110 may be configured to generate the visual indication 414 of a third respective extent, the third respective extent being greater than the second respective extent. As the dependency between the extent of the visual indication 414 and the value of the overlap parameter may be linear, as noted above, in some non-limiting embodiments of the present technology, the third respective extent of the visual indication 414 may be maximum possible; and hence, it may comprise the color change of an entire associated edge of the visual reference frame 404, such as the right edge thereof, as depicted in FIG. 6.

In additional non-limiting embodiments of the present technology, the processor 110 may further be configured to generate an advisory indication of the plurality of predetermined indications. In some non-limiting embodiments of the present technology, the advisory indication may comprise an advisory message 608. Thus, the processor 110 may be configured to output the advisory message 608 in the information message window 406 within the screen 215, thereby prompting the user 230 to adjust the camera 220 relative to the 3D object 350. Also, as depicted in FIG. 6, the processor 110 may further be configured to cause change of color of the information message window 406 when outputting therein the advisory message 608 for drawing more attention of the user 230 to the current position of the camera 220.

Also, in some non-limiting embodiments of the present technology (not depicted), if the overlap parameter associated with a given one of the plurality of images of the 3D object 350 exceeds any one of the plurality of overlap parameter thresholds at two opposite ones of the edges of the visual reference frame 404, the processor 110 may be configured to generate a third error indication of the plurality of predetermined indications. In some non-limiting embodiments of the present technology, the third error indication may comprise a second error message (not depicted) to be output in the information message window 406. For example, the second error message may be to notify the user 230 that the camera 220 is positioned too close to the 3D object 350.

Thus, as it can be appreciated from the above, in some non-limiting embodiments of the present technology, in response to the overlap parameter exceeding the plurality of overlap parameter of thresholds, the processor 110 may be configured to generate respective ones the plurality of predetermined indications for adjusting the camera 220 relative to the 3D object 350, such that each of the respective indications is sequentially more prominent as the value of the overlap parameter increases. As illustrated by the non-limiting examples above, as the value of the overlap parameter increases, the processor 110 may be configured to generate the visual indication 414 of a higher respective extent and may further add advisory messages aimed at drawing more attention of the user 230 as the position of the camera 220 relative to the 3D object 350 gets more offset from a respective position allowing for generation of the panoramic view of the 3D object 350. The higher respective extent of the indication can be more pronounced visual indication, an additional haptic indication, an additional audible indication, or any combination of same. In other words, in these embodiments, a given one of the respective indications associated with a given one of the plurality of overlap parameter thresholds is more pronounced than a previous one of the respective indications associated with a previous one of the plurality of overlap parameter thresholds. By so doing, the processor 110 may be configured to adjust each one of the plurality of images of the 3D object, such as the first image 402, the second image 502, and the third image 602 thereof, thereby allowing generating the panoramic view of the 3D object.

Displaying Video Recording

Figure 7:
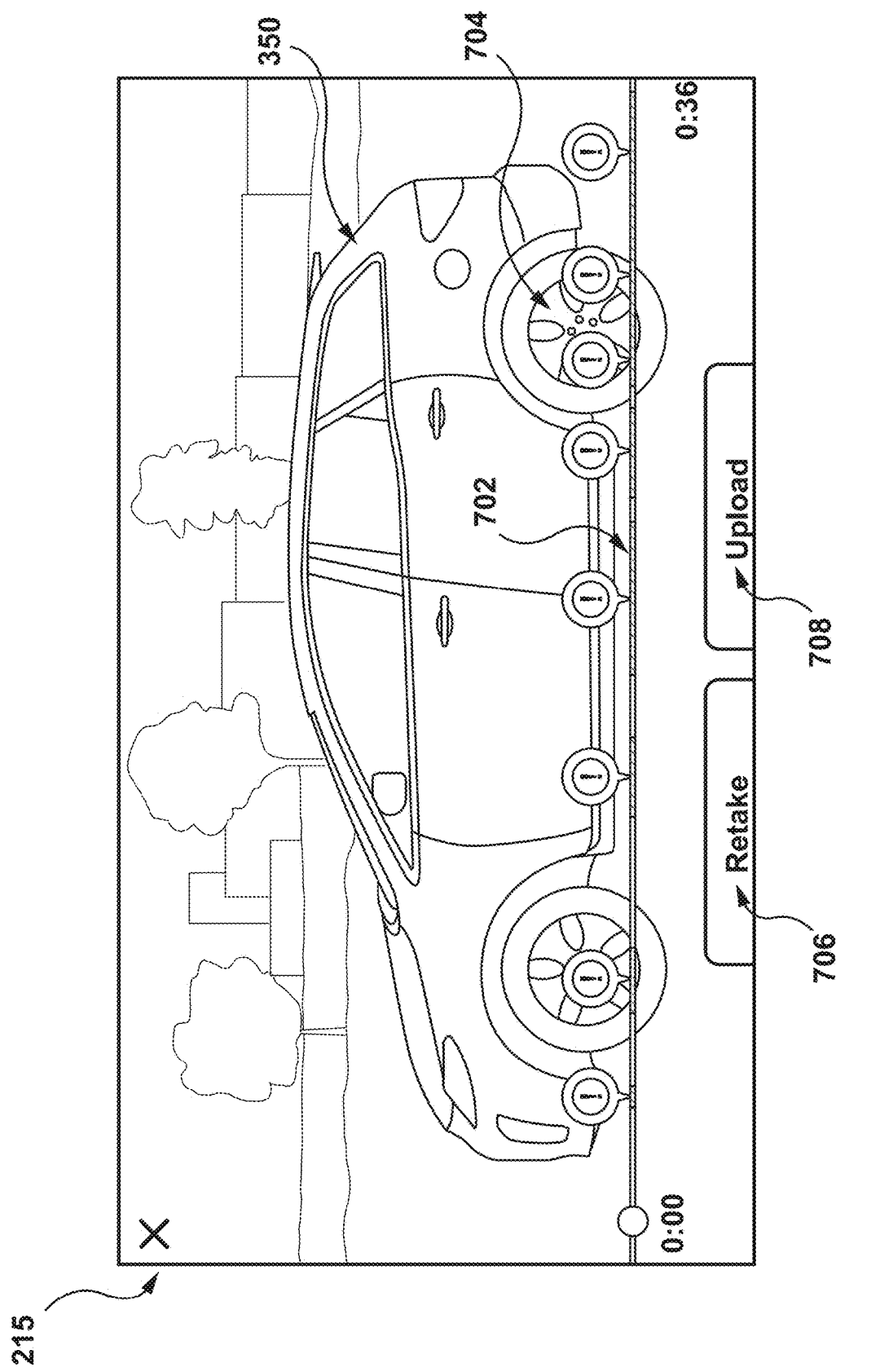
FIG. 7 depicts a schematic diagram of a GUI for causing, by the processor of the computer system of FIG. 1, display of the video recording of the 3D object present in FIG. 3, in accordance with certain non-limiting embodiments of the present technology.

As noted hereinabove, in some non-limiting embodiments of the present technology, the processor 110 may be configured to store and further to cause display of the so generated video recording of the 3D object 350 in the screen 215 of the electronic device 210. With reference to FIG. 7, there is depicted a schematic diagram of a GUI during displaying, by the processor 110, the video recording including the plurality of images of the 3D object 350, in accordance with certain non-limiting embodiments of the present technology.

As it can be appreciated, the video recording may be associated with a video recording timeline 702 for navigating within the video recording to a given moment in time associated with a respective one of the plurality of images of the 3D object 350. Further, in some non-limiting embodiments of the present technology, the video recording timeline 702 may further comprise a plurality of timestamps 704. In these embodiments, each one of the plurality of timestamps 704 can be associated with a respective moment in time when a respective one of the plurality of images associated with at least one of the plurality of predetermined indications was generated.

Accordingly, the user 230 may actuate (such as by tapping or clicking on) a given one of the plurality of timestamps 704 to view an associated image—such as one of the first image 402, the second image 502, and the third image 602, and one or more of the plurality of predetermined indications associated therewith, such as at least one of: the first error indication, the second error indication, the third error indication, the visual indication 414, and the advisory message 608, for example, as described above with reference to respective Figures.

Further, in some non-limiting embodiments of the present technology, the processor 110 may be configured to generate a first user actuator 706 and a second user actuator 708 associated with the video recording of the 3D object 350. For example, the first user actuator 706 may be configured to cause the processor 110 to retake the plurality of images of the 3D object 350. To that end, the processor 110 may be configured delete each one of the plurality of images, such as the first image 402, the second image 502, and the third image 602 having been taken before, and generate the plurality of images one more time as described above. Further, the second user actuator 708 may be configured to cause the processor 110 to upload the video recoding, via the communication network 240, to the server 250. Accordingly, the server 250 may further be configured to provide, via the communication network 240, general access to the video recording of the 3D object 350 to the plurality of other electronic devices (not depicted) as described above with respect to the networked computing environment. As mentioned above, the video recording may be used as the panoramic view of the 3D object 350 simulating the walk around the 3D object 350.

Thus, in some non-limiting embodiments of the present technology, based on the plurality of timestamps 704—for example, a number thereof or associated ones of the plurality of predetermined indications—the user 230 may actuate one of the first user actuator 706 and the second user actuator 708 causing the processor 110 to execute one of the respective procedures described above.

It should be noted that, in additional non-limiting embodiments of the present technology, the processor 110 may be configured to execute the respective procedures associated with the first user actuator 706 and the second user actuator 708 automatically, that is, without the user 230 actuating them. For example, the processor 110 may be configured either to retake the video recording or upload it to the server 250 based on a predetermined timestamp number threshold—such as 3, as an example. Also, the processor 110 may be configured to retake the video recording of the 3D object 350 if there has been triggered at least one specific predetermined indication of the plurality of predetermined indications—such as the third error indication, as an example.

Method

Figure 8:
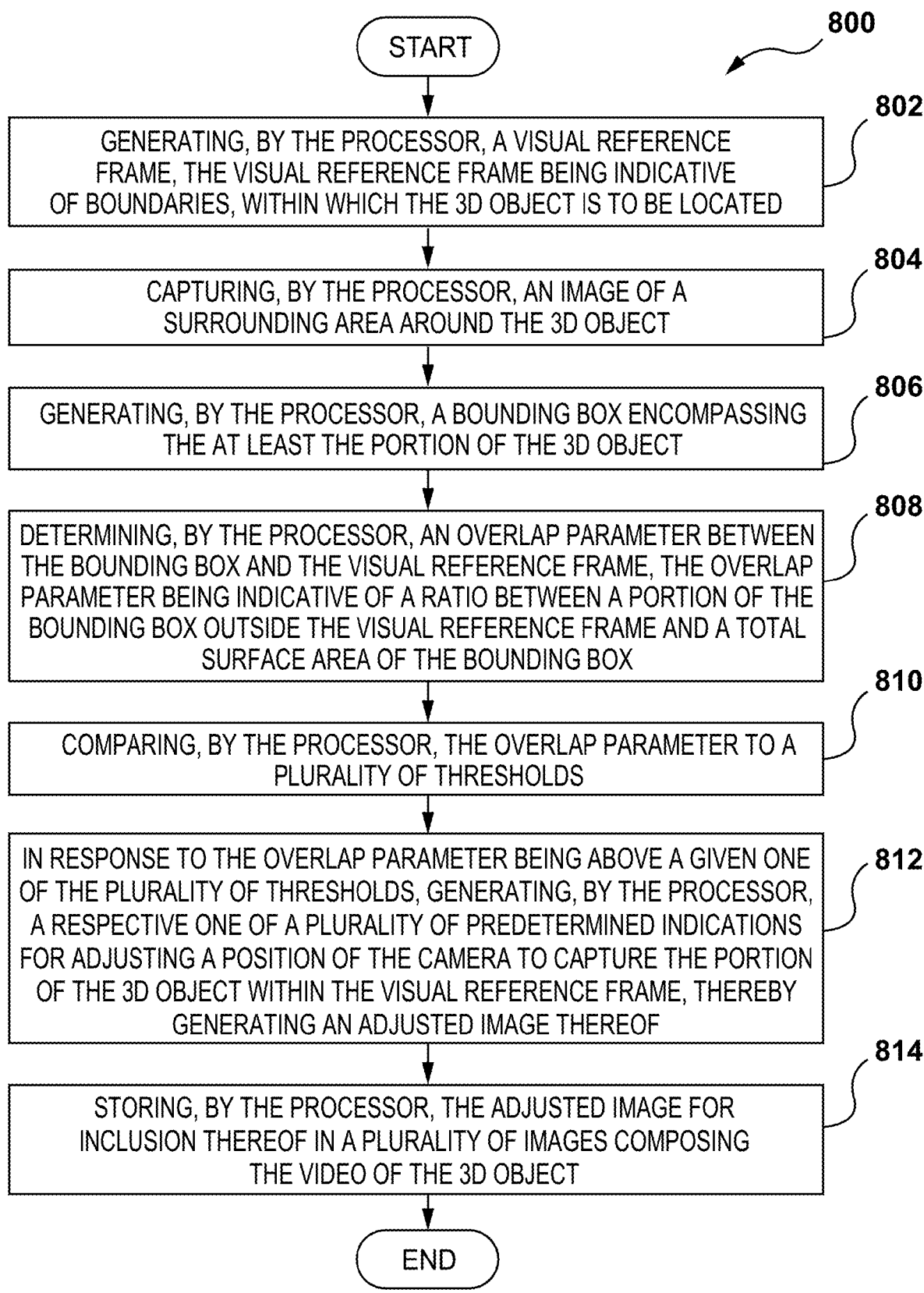
FIG. 8 depicts a flowchart diagram of a method for generating, by the processor of the computer system of FIG. 1, the video recording of the 3D object present in FIG. 3, in accordance with certain non-limiting embodiments of the present technology.

Given the architecture and the examples provided hereinabove, it is possible to execute a method for generating a video of a 3D object, such as the video recording of the 3D object 350. With reference now to FIG. 8, there is depicted a flowchart of a method 800, according to the non-limiting embodiments of the present technology. The method 800 may be executed by the processor 110.

In accordance with certain non-limiting embodiments of the present technology, the video recording may comprise the plurality of images sequentially captured, by the camera 220 communicatively coupled with the electronic device 210. In certain non-limiting embodiments of the present technology, the camera 220 may be caused to move around the 3D object 350, such as by the user 230, as described with reference to FIG. 3. Thus, the plurality of images of the 3D object 350 may represent a respective plurality of various aspects of the 3D object 350, each of which has been taken at a respective perspective of the camera 220.

Therefore, the plurality of images associated with the video recording of the 3D object 350 may be used for composing the panoramic view thereof simulating, for other users (such as those associated with the plurality of other electronic devices mentioned above), a walk around—for example, along the given trajectory 320 as depicted in FIG. 3.

Step 802: Generating, by the Processor, a Visual Reference Frame, the Visual Reference Frame being Indicative of Boundaries, within which the 3D Object is to be Located The method 800 commences at step 802 with the processor 110 being configured to generate, in the screen 215 of the electronic device 210, a visual reference frame, such as the visual reference frame 404 as depicted in FIGS. 4 to 6. In accordance with certain non-limiting embodiments of the present technology, the visual reference frame 404 as an aid for a user (such as the user 230) to orient the camera 220 relative to the 3D object 350 while capturing a given one of the plurality of mages thereof—such as the first image 402 thereof depicted in FIG. 4.

In some non-limiting embodiments of the present technology, the visual reference frame 404 may be used for generating at least some of the plurality of predetermined indications, such as the visual indication 414, as described above.

The method 800 hence proceeds to step 804.

Step 804: Capturing, by the Processor, an Image of a Surrounding Area Around the 3D Object Further, at step 804, in some non-limiting embodiments of the present technology, once the camera 220, using the visual reference frame 404, has been oriented relative to the 3D object 350, the processor 110 may be configured to generate a given one of the plurality of images, such as the first image 402, the second image 502, and the third image 602, respectively depicted in FIGS. 4 to 6. Each one of the plurality of images depicting a respective given portion of the 3D object 350 indicative of an associated aspect thereof used for generating the panoramic view thereof.

As mentioned hereinabove, in some non-limiting embodiments of the present technology, the processor 110 may be configured to discard the given one of the plurality of images if it was captured in less than the predetermined time interval after capturing a previous one of the plurality of images, the previous one of the plurality of images was captured immediately prior to the capturing the given one of the plurality of images.

Further, in some non-limiting embodiments of the present technology, the processor 110 may further be configured to detect, within the given one of the plurality of images the respective given portion of the 3D object 350, for example, the first given portion thereof in the first image 402.

To that end, the processor 110 may first be configured to convert the first image 402 into one of predetermined image formats, which may be, in specific non-limiting embodiments of the present technology, the 32 RGBA image form, as described above. In additional non-limiting embodiments of the present technology, prior to the converting, the processor 110 may be configured to compress the first image 402 to the predetermined size, for example, 300 by 300 pixels.

Further, in some non-limiting embodiments of the present technology, as described above with reference to FIG. 4, the processor 110 may be configured to apply the one or more object recognition techniques for detecting the first given portion of the 3D object 350. Accordingly, by doing so, the processor 110 may be configured to determine the object type associated with the 3D object 350. In some non-limiting embodiments of the present technology, in response to not being able to determine the object type in the predetermined number of consecutively taken ones of the plurality of images, the processor 110 may be configured to generate the first error indication of the plurality of predetermined indications, as described above.

Further, in some non-limiting embodiments of the present technology, the processor 110 may be configured to determine whether the 3D object 350 is of the predetermined object type, such as the vehicle. For example, in some non-limiting embodiments of the present technology, the processor 110 may be configured to discard the first image 402 in response to determining, based on the first given portion of the 3D object 350, that the 3D object 350 is not of the predetermined object type.

The method 800 hence advances to step 806.

Step 806: Generating, by the Processor, a Bounding Box Encompassing the at Least the Portion of the 3D Object Further, at step 806, the processor 110 may be configured to generate, within the screen 215 of the electronic device 210, a bounding box, such as the bounding box 410, encompassing the respective given portion of the 3D object 350 in each one of the plurality of images composing the panoramic view of the 3D object 350.

Further, based on the size of the bounding box 410 relative to the visual reference frame 404, the processor 110 may be configured to discard at least some of the plurality of images of the 3D object 350 from further processing.

For example, in some non-limiting embodiments of the present technology, the processor 110 may be configured to discard the first image 402 if at least one of the vertical dimension and the horizontal dimension of the bounding box 410 encompassing the first given portion of the 3D object 350 is less than the respective one of the vertical dimensional threshold value and the horizontal dimensional threshold value, as described above with reference to FIG. 4.

Further, in some non-limiting embodiments of the present technology, the processor 110 may be configured discard the first image 402 from further processing if the bounding box 410 encompassing the first given portion of the 3D object 350 has such dimensions that it does not cover the center of the visual reference frame 404. Also, in other non-limiting embodiments of the present technology, the processor 110 can be configured to discard the first image 402 if the center of the bounding box 410 is offset at a distance from the center of the visual reference frame 404 greater than the predetermined offset distance threshold value.

In additional non-limiting embodiments of the present technology (not depicted), in response to detecting, within the first image 402, along the first given portion of the 3D object 350, a given portion of the second 3D object, the processor 110 may be configured to generate the second bounding box (not depicted) encompassing the given portion of the second 3D object (not depicted). Further, in these embodiments (not depicted), the processor 110 may be configured to select, for further processing, one of the 3D object 350 and the second 3D object (not depicted) associated with a respective one of the bounding box 410 and the second bounding box (not depicted) having the smallest dimensions.

Finally, in some non-limiting embodiments of the present technology, in response to the bounding box 410 being spaced away from any of the edges of the visual reference frame 404 at the distance, such as the given distance 412 depicted in FIG. 4, the processor 110 may be configured to generate the second error indication of the plurality of predetermined indications. In specific non-limiting embodiments of the present technology, the second error indication may comprise the haptic interaction between the user 230 and the electronic device 210, as described above.

The method 800 thus proceeds to step 808.

Step 808: Determining, by the Processor, an Overlap Parameter Between the Bounding Box and the Visual Reference Frame At step 808, according to certain non-limiting embodiments of the present technology, the processor 110 may be configured to generate one or more of the plurality of predetermined indications for adjusting the position of the camera 220 relative to the 3D object 350, in each one of the plurality of images thereof, based on the overlap parameter between the bounding box 410 and the visual reference frame 404, as described above with reference to FIGS. 4 to 6.

In some non-limiting embodiments of the present technology, the overlap parameter can be determined as a ratio of a portion of the total surface (not separately labelled) of the bounding box 410 outside the visual reference frame 404 to the total surface area of the bounding box 410. However, in other non-limiting embodiments of the present technology, the overlap parameter may be determined as an absolute size, such as in points, for example, of a portion of the bounding box 410 covering a respective one of the edges of the visual reference frame 404.

The method 800 thus advances to step 810

Step 810: Comparing, by the Processor, the Overlap Parameter to a Plurality of Thresholds At step 810, according to certain non-limiting embodiments of the present technology, the processor 110 may be configured to compare the overlap parameter associated with the given one of the plurality of images of the 3D object 350 to the plurality of overlap parameter thresholds, as described above with reference to FIGS. 4 to 6.

As it can be appreciated, depending on specific embodiments, each one of the plurality of overlap parameter thresholds may comprise at east one of: (1) the respective percentage threshold value of the overlap parameter; and (2) the respective absolute threshold value of the overlap parameter indicative of an absolute value of a size of the outside portion of the bounding box 410.

In some non-limiting embodiments of the present technology, the plurality of overlap parameter thresholds may include at least three overlap parameter thresholds: a lower overlap parameters threshold, a middle overlap parameters threshold, and a higher overlap parameter threshold. In specific non-limiting embodiments of the present technology, each one of the plurality of overlap parameter thresholds may further be, depending on specific embodiments, respectively: 1% or 5 points; 5% or 25 points; and 11% or 55 points, as an example.

In some non-limiting embodiments of the present technology, both a current percentage of the overlap parameter and a current absolute value thereof may be determined, by the processor 110, simultaneously for each one of the plurality of images. Further, in these embodiments, the processor 110 may be configured to select a minimum one of the current percentage of the overlap parameter and the current absolute value thereof for comparing to the plurality of overlap parameter thresholds. By so doing, the overlap parameter may be reliably assessed irrespective of a size of the screen 215 of the electronic device 210.

The method 800 thus proceeds to step 812.

Step 812: In Response to the Overlap Parameter being Above a Given One of the Plurality of Thresholds, Generating, by the Processor, a Respective One of a Plurality of Predetermined Indications for Adjusting a Position of the Camera to Capture the Portion of the 3D Object within the Visual Reference Frame, Thereby Generating an Adjusted Image Thereof At step 812, according to certain non-limiting embodiments of the present technology, in response to determining that the overlap parameter associated with the given one of the plurality of images exceeds a given one of the plurality of overlap parameter thresholds, the processor 110 may be configured to generate respective one or more of the plurality of predetermined indications.

For example, in response to the overlap parameter between the bounding box 410 and a given one of the edges of the visual reference frame 404 being equal to or greater than the lower overlap parameter threshold (but less than the middle overlap parameter threshold), the processor 110 may be configured to generate the visual indication 414 of the first respective extent, as depicted in FIG. 4, as an example.

Further, as depicted in FIG. 5, in response to the overlap parameter associated with the second image 502 exceeding the middle overlap parameter threshold (however, does not exceed the higher overlap parameter threshold), the processor 110 may be configured to generate the visual indication 414 of the second respective extent, the second respective extent being greater than the first respective extent.

Finally, in response to the overlap parameter exceeding the higher overlap parameter threshold, the processor 110 may be configured to generate the visual indication 414 of the third respective extent, the third respective extent being greater than the second respective extent. As mentioned above, the dependency between the extent of the visual indication 414 and the value of the overlap parameter may be linear; therefore, in some non-limiting embodiments of the present technology, the third respective extent of the visual indication 414 may be maximum possible; and hence, it may comprise the color change of an entire associated edge of the visual reference frame 404, such as the right edge thereof, as depicted in FIG. 6.

In additional non-limiting embodiments of the present technology, the processor 110 may further be configured to generate an advisory indication of the plurality of predetermined indications, in response to the overlap parameter exceeding the higher overlap parameter threshold. In some non-limiting embodiments of the present technology, the advisory indication may comprise the advisory message 608. Thus, the processor 110 may be configured to output the advisory message 608 in the information message window 406 within the screen 215, thereby prompting the user 230 to adjust the camera 220 relative to the 3D object 350. Also, as depicted in FIG. 6, the processor 110 may further be configured to cause change of color of the information message window 406 when outputting therein the advisory message 608 for drawing more attention of the user 230 to the current position of the camera 220.

Also, in some non-limiting embodiments of the present technology (not depicted), if the overlap parameter associated with the given one of the plurality of images of the 3D object 350 exceeds any one of the plurality of overlap parameter thresholds at two opposite ones of the edges of the visual reference frame 404, the processor 110 may be configured to generate the third error indication of the plurality of predetermined indications notifying the user 230 that the camera 220 is positioned too close to the 3D object 350, as an example.

Thus, in certain non-limiting embodiments of the present technology, as the value of the overlap parameter increases, the processor 110 may be configured to generate a more pronounced one of the plurality of predetermined indications, that is, gradually increasing the extent of the visual indication 414 and adding advisory messages, which is aimed at drawing more attention of the user 230 as the current position of the camera 220 relative to the 3D object 350 is being offset farther away from a position allowing for generation the panoramic view thereof. In other words, in certain non-limiting embodiments of the present technology, the plurality of predetermined indications may comprise escalating predetermined indications, wherein each one of the escalating predetermined indications is more prominent than a previous one as the value of the overlap parameter increases.

Thus, responsive to each one of the plurality of predetermined indication, the user 230 may adjust the camera 220 relative to the 3D object 350, thereby producing respective adjusted images of the plurality of images enabling the processor 110 compiling the panoramic view of the 3D object 350.

The method 800 thus advances to step 814.

Step 814: Storing, by the Processor, the Adjusted Image for Inclusion Thereof in a Plurality of Images Composing the Video of the 3D Object At step 814, in some non-limiting embodiments of the present technology, the processor 110 may be configured to store the plurality of images associated with the video recording of the 3D object 350 generated as described above in one of the solid-state drive 120 and the random-access memory 130.

Further, the processor 110 may be configured to cause display of the video recording of the 3D object 350 in the screen 215 of the electronic device 210, as described above with reference to FIG. 7. More specifically, the processor 110 may be configured to cause display of the video recording including the video recording timeline 702 for navigating within the video recording to a given moment in time associated with a respective one of the plurality of images of the 3D object 350. Further, in some non-limiting embodiments of the present technology, the video recording timeline 702 may further comprise the plurality of timestamps 704. Each one of the plurality of timestamps 704 can be associated with a respective moment in time when a respective one of the plurality of images associated with at least one of the plurality of predetermined indications was generated.

Accordingly, by actuating a given one of the plurality of timestamps 704 to view an associated image—such as one of the first image 402, the second image 502, and the third image 602, and one or more of the plurality of predetermined indications associated therewith, such as at least one of: the first error indication, the second error indication, the third error indication, the visual indication 414, and the advisory indication (such as the advisory message 608), for example, as described above.

Finally, in some non-limiting embodiments of the present technology, the processor 110 may be configured to transmit the video recording of the 3D object 350, via the communication network 240, t the server 250. The server 250 may be configured to provide, via the communication network 240, general access to the video recording to the plurality of other electronic devices, as described above.

Thus, certain embodiments of the method 800 allow generating video recordings of various 3D objects of better quality, allowing for a more realistic walk around view thereof, which may further enable to provide more specific information on visual aspects of the 3D objects.

The method 800 thus terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A method for generating a video of a 3D object using a camera, the method being executable by a processor of the camera, the method comprising:
   generating, by the processor, a visual reference frame, the visual reference frame being indicative of boundaries, within which the 3D object is to be located;
   capturing, by the processor, an image of a surrounding area around the 3D object;

in response to detecting, by the processor, within the image, at least a portion of the 3D object:
generating, by the processor, a bounding box encompassing the at least the portion of the 3D object;
determining, by the processor, an overlap parameter between the bounding box and the visual reference frame,
the overlap parameter being indicative of a ratio between a portion of the bounding box outside the visual reference frame and a total surface area of the bounding box;
comparing, by the processor, the overlap parameter to a plurality of thresholds,
in response to the overlap parameter being above a given one of the plurality of thresholds,
generating, by the processor, a respective one of a plurality of predetermined indications for adjusting a position of the camera to capture the portion of the 3D object within the visual reference frame, thereby generating an adjusted image thereof;
storing, by the processor, the adjusted image for inclusion thereof in a plurality of images composing the video of the 3D object.

2. The method of claim 1, wherein the plurality of predetermined indications comprises a plurality of escalating indications, the plurality of escalating indications being sequentially more prominent as the overlap parameter increases.

3. The method of claim 2, wherein a given one of the plurality of predetermined indications associated with a given one of the plurality of thresholds is more pronounced than a previous one of the plurality of predetermined indications associated with a previous one of the plurality of thresholds.

4. The method of claim 1, wherein each one of the plurality of thresholds is associated with one of: a respective constant absolute value of the overlap parameter and a respective percentage of an associated edge of the visual reference frame covered by the bounding box outside thereof.

5. The method of claim 1, wherein in response to the overlap parameter being above the given one of the plurality of thresholds at two opposite edges of the visual reference frame, the method further comprises generating a first error indication.

6. The method of claim 1, wherein the capturing the image is executed in response to the camera being caused to move around the 3D object.

7. The method of claim 6, wherein the video is a sequence of images making up a panoramic view.

8. The method of claim 1, wherein in response to the capturing the image of the surrounding area around the 3D object being executed less than a predetermined period after generating a pervious one of the plurality of images composing the video of the 3D object, the method further comprises discarding the image from further processing.

9. The method of claim 1, wherein the detecting, within the image, the at least the portion of the 3D object, further comprises compressing the image.

10. The method of claim 9, wherein the compressing further comprises converting the image into a pixel buffer having a 32-bit RGBA format.

11. The method of claim 1, wherein the method further comprises determining, based on the at least the portion of the 3D object, a type of the 3D object.

12. The method of claim 11, wherein in response to the 3D object being not of a predetermined type of 3D objects, the method further comprises discarding the image from further processing.

13. The method of claim 12, wherein in response to not determining the type of the 3D object as being the predetermined type in a predetermined number of consecutively captured images, the method further comprises generating a second error indication.

14. The method of claim 13, wherein the predetermined type of 3D object comprises a vehicle.

15. The method of claim 1, wherein in response to the bounding box encompassing the at least the portion of the 3D object having dimensions smaller than respective predetermined thresholds, the method further comprises discarding the image from further processing.

16. The method of claim 1, wherein in response to the bounding box encompassing the at least the portion of the 3D object being offset at a distance from a center of the visual reference frame greater than a predetermined distance threshold, the method further comprises discarding the image from further processing.

17. The method of claim 1, wherein in response to detecting, within the image, along with the at least the portion of the 3D object, at least an other portion of an other 3D object, the method further comprises:
generating for the at least the other portion of the other 3D object, a second bounding box;
determining respective dimensions of the bounding box and the second bounding box; and
selecting for further processing one of the bounding box and the second bounding box having smaller dimensions.

18. The method of claim 1, wherein in response to the bounding box being positioned within the visual reference frame at a distance spaced away from any of edges thereof by less than a first predetermined distance threshold value, the method further comprises generating a third error indication.

19. The method of claim 18, wherein the third error indication comprises a haptic indication.

20. The method of claim 1, wherein the method further comprises causing display of the video of the 3D object.

21. The method of claim 20, wherein the causing display further comprises causing display of indications of each one the plurality of predetermined indications associated with respective timestamps,
a given timestamp associated with a given one of the plurality of predetermined indications being indicative of a time when the given one of the plurality of predetermined indications was generated.

22. The method of claim 21, wherein the causing display further comprises causing display of an associated triggered one of the plurality of predetermined indications for a given of the plurality of images.

* * * * *